(12) United States Patent
Ciaramella et al.

(10) Patent No.: US 8,989,585 B2
(45) Date of Patent: Mar. 24, 2015

(54) FREE SPACE OPTICAL COMMUNICATIONS LINK NODE, NETWORK AND METHOD OF TRANSMITTING TRAFFIC

(75) Inventors: Ernesto Ciaramella, Rome (IT); Antonio D'Errico, Calci (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 195 days.

(21) Appl. No.: 13/876,954

(22) PCT Filed: Nov. 8, 2010

(86) PCT No.: PCT/EP2010/067040
§ 371 (c)(1),
(2), (4) Date: Oct. 10, 2013

(87) PCT Pub. No.: WO2012/041403
PCT Pub. Date: Apr. 5, 2012

(65) Prior Publication Data
US 2014/0023377 A1 Jan. 23, 2014

(30) Foreign Application Priority Data
Sep. 29, 2010 (EP) .................................... 10181663

(51) Int. Cl.
*H04B 10/00* (2013.01)
*H04B 10/11* (2013.01)
(Continued)

(52) U.S. Cl.
CPC ............ *H04B 10/11* (2013.01); *H04B 10/1125* (2013.01); *H04J 14/0221* (2013.01)
USPC ............ 398/120; 398/119; 398/128; 398/130

(58) Field of Classification Search
CPC ............... H04B 10/11; H04B 10/1123; H04B 10/1125; H04B 10/1127; H04B 10/1141; H04B 10/1143; H04B 10/2972; H04B 10/564; H04J 14/0221
USPC ............... 398/91, 93, 94, 118, 119, 128, 130, 398/158, 160, 195, 197
See application file for complete search history.

(56) References Cited

U.S. PATENT DOCUMENTS 6,744,964 B1 * 6/2004 Vittal ............................ 385/140
2002/0167697 A1 * 11/2002 Willebrand .................... 359/152
(Continued)

FOREIGN PATENT DOCUMENTS

EP          1 365 526       11/2003
WO         WO 01/06083      1/2001

OTHER PUBLICATIONS

International Search Report for PCT/EP2010/067040 mailed Jul. 4, 2011.
(Continued)

*Primary Examiner* — Dalzid Singh

(57) ABSTRACT

A free space optical communications link node 10 comprising transmitter apparatus 12 comprising a first optical transmitter 14, arranged to transmit high priority traffic on a first upstream optical signal having a first wavelength and at a first optical signal power, and a second optical transmitter 16 arranged to transmit low priority traffic on a second upstream optical signal having a second wavelength, different to the first wavelength, and at a second optical signal power. The node 10 further comprises receiver apparatus 18 comprising a first optical amplifier 20 arranged to receive and amplify a first downstream optical signal having a third wavelength and carrying high priority traffic and a second downstream optical signal having a fourth wavelength, different to the third wavelength, and carrying low priority traffic. The node 10 further comprises traffic handling control apparatus 22 comprises a power monitor 24 arranged to monitor an optical signal power of the first downstream optical signal and a controller 26 arranged to generate and transmit a control signal 28 if said optical signal power is below a first threshold value. The control signal is arranged to cause the second optical signal power to have a value which is unsuitable for transmission.

15 Claims, 12 Drawing Sheets

(51) Int. Cl.
*H04B 10/112* (2013.01)
*H04J 14/02* (2006.01)

(56) References Cited

U.S. PATENT DOCUMENTS

2003/0053193 A1* 3/2003 Minakawa .................... 359/333
2003/0231887 A1 12/2003 Grassi et al.

OTHER PUBLICATIONS

M. Hayashitani et al., "A High-Speed Protection Scheme for Multiple-Priority-Class Traffic in WDM Ring Networks", 2008 14th Asia-Pacific Conference on Communications, Oct. 14, 2008, pp. 1-5.

Y. Arimoto et al., "320 Gbit/s (8x33 40 Gbit/s) Double-Pass Terrestrial Free-Space Optical Link Transparently Connected to Optical Fibre Lines", ECOC2008, Sep. 21, 2008, 2 pages.

E. Ciaramella et al., "1.28-Tb/s (32x33 40 Gb/s) Free-Space Optical WDM Transmission System", IEEE Photonics Technology Letters, vol. 21, No. 16, Aug. 15, 2009, pp. 1121-1123.

S. Perrin, "The Future of Packet-Optical Transport for Mobile Backhaul", Heavy Reading, vol. 8, No. 6, May 2010, 46 pages.

M. Abtahi et al., "Suppression of Turbulence-Induced Scintillation in Free-Space Optical Communication Systems Using Saturated Optical Amplifiers", Journal of Lightwave Technology, vol. 24, No. 12, Dec. 2006, pp. 4966-4973.

* cited by examiner

FREE SPACE OPTICAL COMMUNICATIONS LINK NODE, NETWORK AND METHOD OF TRANSMITTING TRAFFIC

This application is the U.S. national phase of International Application No. PCT/EP2010/067040 filed 8 Nov. 2010 which designated the U.S. and claims priority to EP 10181663.5 filed 29 Sep. 2010, the entire contents of each of which are hereby incorporated by reference.

TECHNICAL FIELD

The invention relates to a free space optical communications link node, a free space optical communications network and a method of transmitting traffic across a free space optical communications link.

BACKGROUND

In mobile telecommunications backhaul, service providers are mainly attracted by solutions which provide high available bandwidth (>1 Gb/s), with high efficiency, at low operating cost. Free space optical (FSO) communications offers fibre like bandwidth, while reducing the cost per transmitted bit as compared to a fibre based system. To realize a mobile backhaul connection for carrier class applications, 99.999% link reliability is mandatory. 99.98% link availability using transparent FSO terminals capable of transmitting up to 1.2 Tb/s capacity traffic has recently been reported by E. Ciaramella et al, "1.28-Tb/s (32×40 Gb/s) Free-Space Optical WDM Transmission System", Photonics Technology Letters, vol. 21, no. 16, 15 Aug. 2009, pages 1121-1123.

SUMMARY

It is an object to provide an improved free space optical communications link node. It is a further object to provide an improved free space optical communications network. It is a further object to provide an improved method of transmitting traffic across a free space optical communications link.

A first aspect of the invention provides a free space optical communications link node comprising transmitter apparatus, receiver apparatus and traffic handling control apparatus. The transmitter apparatus comprises a first optical transmitter and a second optical transmitter. The first optical transmitter is arranged to transmit high priority traffic on a first upstream optical signal having a first wavelength and at a first optical signal power. The second optical transmitter is arranged to transmit low priority traffic on a second upstream optical signal having a second wavelength and at a second optical signal power. The second wavelength is different to the first wavelength. The receiver apparatus comprises a first optical amplifier. The first optical amplifier is arranged to receive and amplify a first downstream optical signal having a third wavelength and carrying high priority traffic. The first optical amplifier is further arranged to receive and amplify a second downstream optical signal having a fourth wavelength and carrying low priority traffic. The fourth wavelength is different to the third wavelength. The traffic handling control apparatus comprises a power monitor and a controller. The power monitor is arranged to monitor an optical signal power of the first downstream optical signal. The controller is arranged to generate and transmit a control signal if said optical signal power is below a first threshold value. The control signal is arranged to cause the second optical signal power to have a value which is unsuitable for transmission.

The free space optical communications link node may therefore be arranged to cause the second optical signal power to have a value which is unsuitable for transmission when the optical signal power of the first downstream optical signal falls below a first threshold value. As a result, more gain may be available to amplify a first upstream optical signal received at a remote free space optical communications link node comprising a said first optical amplifier. The free space optical communications link node may therefore be controlled to provide more gain to high priority traffic carrying optical signals in situations, such as adverse weather, which may cause a said high priority traffic carrying optical signal to experience increased optical loss due in transmission. The free space optical communications link node may therefore be operated to provide improved link reliability for the transmission of high priority traffic.

In an embodiment, the first optical amplifier is arranged to operate linearly at an input optical signal power below a second threshold value. The first optical amplifier has a gain profile comprising a gain peak and the third wavelength comprises a wavelength within said gain peak. The first optical amplifier is arranged to operate in saturation at an input optical signal power above the second threshold value.

Providing the first optical amplifier with a gain profile comprising a gain peak and arranging the third wavelength to comprise a wavelength within the gain peak may increase the amount of gain available to the first downstream optical signal when the first optical amplifier is operating linearly. The input optical signal power may be below the second threshold value when only a first downstream optical signal is received or when the second downstream optical signal is at an optical signal power unsuitable for transmission.

Operating the first optical amplifier in saturation may reduce the effect of losses due to scintillations during transmission of each optical signal.

In an embodiment, each said wavelength comprises a wavelength in the range 1525 nm to 1560 nm and the third wavelength comprises a wavelength in the range 1525 nm to 1540 nm. The free space optical communications link node is therefore operable within the C-band telecommunications window, with the third wavelength comprising a wavelength in the short C-band, which encompasses for example the gain peak of an erbium doped fibre amplifier.

In an embodiment, the first wavelength is substantially the same as the third wavelength and the second wavelength is substantially the same as the fourth wavelength. A single free space optical communications link node configuration may therefore be used for each node within a network, with a single pair of wavelengths used throughout.

In an embodiment, the first optical amplifier has a gain tilt arranged to cause its gain profile to comprise said gain peak when the input optical signal power is below the second threshold value. Using a first optical amplifier having a gain tilt may further increase the gain available to amplify the first downstream optical signal.

In an embodiment, the transmitter apparatus further comprises a second optical amplifier arranged to receive and amplify each upstream optical signal. The second optical amplifier is arranged to operate in saturation. The control signal is arranged to cause the second optical signal power to have a value such that the second upstream optical signal does not reduce the gain of the second optical amplifier available to amplify the first upstream optical signal.

Operating the second optical amplifier in saturation may reduce the effect of losses due to scintillations during transmission of each optical signal. Reducing the second optical signal power may ensure that the full optical gain available to amplify the first optical signal is made available to the first upstream optical signal. The first upstream optical signal may therefore be amplified to an optical signal power which is higher than it can be amplified to in the presence of the second upstream optical signal.

In an embodiment, the control signal is arranged to cause the second optical signal power to have a value less than an optical signal power loss which the second upstream optical signal will experience during transmission.

The second upstream optical signal will therefore not be received at a remote free space optical communications link node. The second optical transmitter may therefore be operated in an idle mode, at a low optical signal power, which may prolong the life of the second optical transmitter as compared to turning the transmitter on and off in order to control the second optical signal power.

In an embodiment, each control signal is arranged to cause said respective second optical transmitter not to transmit a second optical signal. In an embodiment, each control signal is arranged to cause said respective second optical transmitter to be turned off. Causing the second optical transmitter not to transmit a second optical signal may reduce the power consumption of the node.

In an embodiment, each said optical amplifier comprises one of an erbium doped fibre amplifier, a semiconductor optical amplifier and a Raman amplifier.

A second aspect of the invention provides a free space optical communications network comprising a first free space optical communications link node and a second free space optical communications link node. The second free space optical communications link node is located remote from and arranged for communication with the first free space optical communications link node across a free space optics link. Each free space optical communications link node comprises transmitter apparatus, receiver apparatus and traffic handling control apparatus. The transmitter apparatus comprises a first optical transmitter and a second optical transmitter. The first optical transmitter is arranged to transmit high priority traffic on a first optical signal having a first wavelength and at a first optical signal power. The second optical transmitter is arranged to transmit low priority traffic on a second optical signal having a second wavelength and at a second optical signal power. The second wavelength is different to the first wavelength. The receiver apparatus comprises a first optical amplifier arranged to receive from the other free space optical communications link node a said first optical signal and a said second optical signal. The first optical amplifier is further arranged to amplify each said optical signal. The traffic handling control apparatus comprises a power monitor and a controller. The power monitor is arranged to monitor an optical signal power of said first optical signal received from the other free space optics communications link node. The controller is arranged to generate and transmit a control signal if said optical signal power is below a first threshold value. The control signal is arranged to cause said second optical signal power to have a value which is unsuitable for transmission.

The free space optical communications network may therefore be arranged to cause the second optical signal power to have a value which is unsuitable for transmission when the optical signal power of the first optical signal received from the other free space optical communications link node falls below the first threshold value. As a result, more gain may be available to amplify a first optical signal received at the other free space optical communications link node. The free space optical communications network may therefore be controlled to provide more gain to high priority traffic carrying optical signals in situations, such as adverse weather, which may cause a said high priority traffic carrying optical signal to experience increased optical loss due in transmission. The free space optical communications network may therefore be operated to provide improved link reliability for the transmission of high priority traffic.

In an embodiment, each said optical amplifier is arranged to operate linearly at an input optical signal power below a second threshold value and has a gain profile comprising a gain peak. Said first wavelength comprises a wavelength within said gain peak. Each said optical amplifier is further arranged to operate in saturation at an input optical signal power above said second threshold value.

Providing each first optical amplifier with a gain profile comprising a gain peak and arranging the first wavelength to comprise a wavelength within the gain peak may increase the amount of gain available to a first optical signal received at the other node when the first optical amplifier of said other node is operating linearly. The input optical signal power may be below the second threshold value when only a first optical signal is received or when the second optical signal is at an optical signal power unsuitable for transmission.

In an embodiment, each said wavelength comprises a wavelength in the range 1525 nm to 1560 nm and the first wavelength comprises a wavelength in the range 1525 nm to 1540 nm. The free space optical communications network is therefore operable within the C-band telecommunications window, with the first wavelength comprising a wavelength in the short C-band, which encompasses for example the gain peak of an erbium doped fibre amplifier.

In an embodiment, each said optical amplifier has a gain tilt arranged to cause its gain profile to comprise said gain peak when the input optical signal power is below the second threshold value. Using a first optical amplifier having a gain tilt may further increase the gain available to amplify a first optical signal.

In an embodiment, each transmitter apparatus further comprises a second optical amplifier arranged to receive and amplify said respective first and second optical signals. The second optical amplifier is arranged to operate in saturation. The control signal is arranged to cause said second optical signal power to have a value such that said second optical signal does not reduce the gain of the second optical amplifier available to amplify said first optical signal.

Operating each second optical amplifier in saturation may reduce the effect of losses due to scintillations during transmission of each optical signal. Reducing the second optical signal power may ensure that the full optical gain available to amplify the first optical signal is made available to the first optical signal. The first optical signal may therefore be amplified to an optical signal power which is higher than it can be amplified to in the presence of the second optical signal.

In an embodiment, each control signal is arranged to cause said respective second optical signal power to have a value less than an optical signal power loss of the free space optics link. The second optical signal will therefore not be received at the other free space optical communications link node. The second optical transmitter may therefore be operated in an idle mode, at a low optical signal power, which may prolong the life of the second optical transmitter as compared to turning the transmitter on and off in order to control the second optical signal power.

In an embodiment, each control signal is arranged to cause said respective second optical transmitter not to transmit a second optical signal. In an embodiment, each control signal is arranged to cause said respective second optical transmitter to be turned off. Causing the second optical transmitter not to transmit a second optical signal may reduce the power consumption of the node.

In an embodiment, each said optical amplifier comprises one of an erbium doped fibre amplifier, a semiconductor optical amplifier and a Raman amplifier.

A third aspect of the invention provides a method of transmitting traffic across a free space optical communications link. The method comprises receiving high priority traffic and low priority traffic at a first free space optical communications link node. The method further comprises transmitting the high priority traffic on a first optical signal having a first wavelength and at a first optical signal power, and transmitting the low priority traffic on a second optical signal having a second wavelength and at a second optical signal power. The second wavelength is different to the first wavelength. The method further comprises amplifying each said optical signal received at a second free space optical communications link node located remote from the first free space optical communications link node. The method further comprises monitoring an optical signal power loss of a free space optical link between said first and second free space optical communications link nodes. If the optical signal power loss is above a threshold value, the method comprises causing the second optical signal power to have a value which is unsuitable for transmission.

The method may be implemented to cause the second optical signal power to have a value which is unsuitable for transmission when the optical signal power of the first optical falls below a first threshold value. As a result, more gain may be available to amplify the first optical signal received at the second free space optical communications link node. The method may therefore be used to provide more gain to high priority traffic carrying optical signals in situations, such as adverse weather, which may cause a said high priority traffic carrying optical signal to experience increased optical loss due in transmission. The method may therefore provide improved link reliability for the transmission of high priority traffic.

In an embodiment, each said optical signal received at said second free space optical communications link node is amplified by an optical amplifier arranged to operate linearly at an input optical signal power below a second threshold value and having a gain profile comprising a gain peak. Said first wavelength comprises a wavelength within said gain peak. Said optical amplifier is arranged to operate in saturation at an input optical signal power above said second threshold value.

Operating the optical amplifier linearly, to cause it to have a gain profile comprising a gain peak, and arranging the first wavelength to comprise a wavelength within the gain peak may increase the amount of gain available to the first optical signal. The input optical signal power may be below the second threshold value when only a first optical signal is received or when the second optical signal is at an optical signal power unsuitable for transmission. Causing the optical amplifier to operate in saturation may reduce the effect of losses due to scintillations during transmission of each optical signal.

In an embodiment, each said wavelength comprises a wavelength in the range 1525 nm to 1560 nm and the first wavelength comprises a wavelength in the range 1525 nm to 1540 nm. The method may therefore be used for communications within the C-band telecommunications window, with the first wavelength comprising a wavelength in the short C-band, which encompasses for example the gain peak of an erbium doped fibre amplifier.

In an embodiment, said optical amplifier has a gain tilt arranged to cause its gain profile to comprise said gain peak when the input optical signal power is below the second threshold value. Using an optical amplifier which has a gain tilt may further increase the gain available to amplify the first optical signal.

In an embodiment, the method further comprises amplifying each said optical signal before transmission on the free space optical link. The optical signals are amplified by a second optical amplifier arranged to operate in saturation. The method comprises causing said second optical signal power to have a value such that the second optical signal does not reduce the gain of the second optical amplifier available to amplify the first optical signal.

In an embodiment, the method comprises causing the second optical signal power to have a value less than an optical signal power loss which the second upstream optical signal will experience during transmission. The second upstream optical signal will therefore not be received at the second free space optical communications link node. The second optical signal may therefore be reduced to an idle mode, at a low optical signal power, which may prolong the life of an optical transmitter used to generate the second optical signal as compared to turning the transmitter on and off in order to control the second optical signal power.

In an embodiment, the method comprises causing no second optical signal to be transmitted. This may reduce power consumption.

In an embodiment, each said optical amplifier comprises one of an erbium doped fibre amplifier, a semiconductor optical amplifier and a Raman amplifier.

A fourth aspect of the invention provides a data carrier having computer readable instructions embodied therein. The said computer readable instructions are for providing access to resources available on a processor. The computer readable instructions comprise instructions to cause the processor to perform any of the above steps of the method of transmitting traffic across a free space optical communications link.

Embodiments of the invention will now be described, by way of example only, with reference to the accompanying drawings.

DETAILED DESCRIPTION

Figure 1:
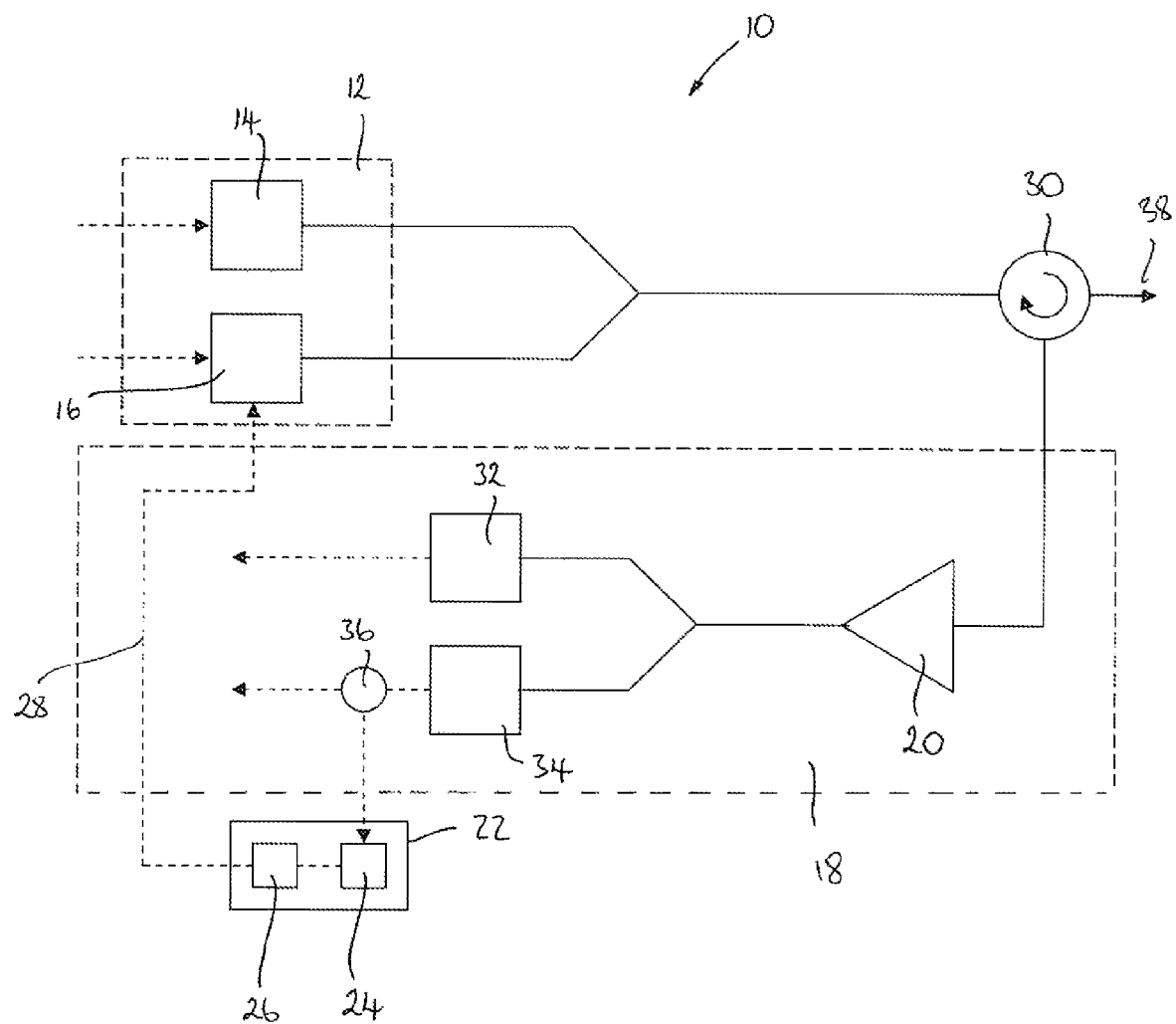
FIG. 1 is a schematic representation of a free space optical communications link node according to a first embodiment of the invention.

Referring to FIG. 1, a first embodiment of the invention provides a free space optical communications link node 10 comprising transmitter apparatus 12, receiver apparatus 18 and traffic handling control apparatus 22.

The transmitter apparatus 12 comprises a first optical transmitter 14 and a second optical transmitter 16. The first optical transmitter 14 is arranged to transmit high priority traffic on a first upstream optical signal having a first wavelength and at a first optical signal power. The second optical transmitter 16 is arranged to transmit low priority traffic on a second upstream optical signal having a second wavelength and at a second optical signal power. The second wavelength is different to the first wavelength. The first and second upstream optical signals are combined and routed via an optical circulator 30 to an input/output port 38 of the node 10.

The receiver apparatus 18 comprises a first optical amplifier 20 arranged to receive and amplify a first downstream optical signal having a third wavelength and carrying high priority traffic. The first optical amplifier 20 is further arranged to receive and amplify a second downstream optical signal having a fourth wavelength and carrying low priority traffic. The fourth wavelength is different to the third wavelength. In this example, downstream optical signals are received at the input/output port 38 and routed to the first optical amplifier 20 via the optical circulator 30.

The traffic handling control apparatus 22 comprises a power monitor 24 and a controller 26. The power monitor 24 is arranged to monitor an optical signal power of the first downstream optical signal. In this example, the first downstream optical signal is received by a first optical receiver 34 and part of the output from the first optical receiver 34 is split by a splitter 36 and directed to the power monitor 24. A second optical receiver 32 is provided to receive a second downstream optical signal.

The controller 26 is arranged to generate and transmit a control signal 28 if the optical signal power of the first downstream optical signal is below a first threshold value. The control signal 28 is delivered to the second optical transmitter 16 and is arranged to cause the second optical signal power to have a value which is unsuitable for transmission. By unsuitable for transmission we mean that the optical signal power is such that the second upstream optical signal is not received at a remote free space optical communications link node or that the second upstream optical signal when received at a remote free space optical communications link node is unusable, for example due to its signal power level being too low, or its optical signal to noise ratio or bit error rate being unacceptable.

Figure 2:
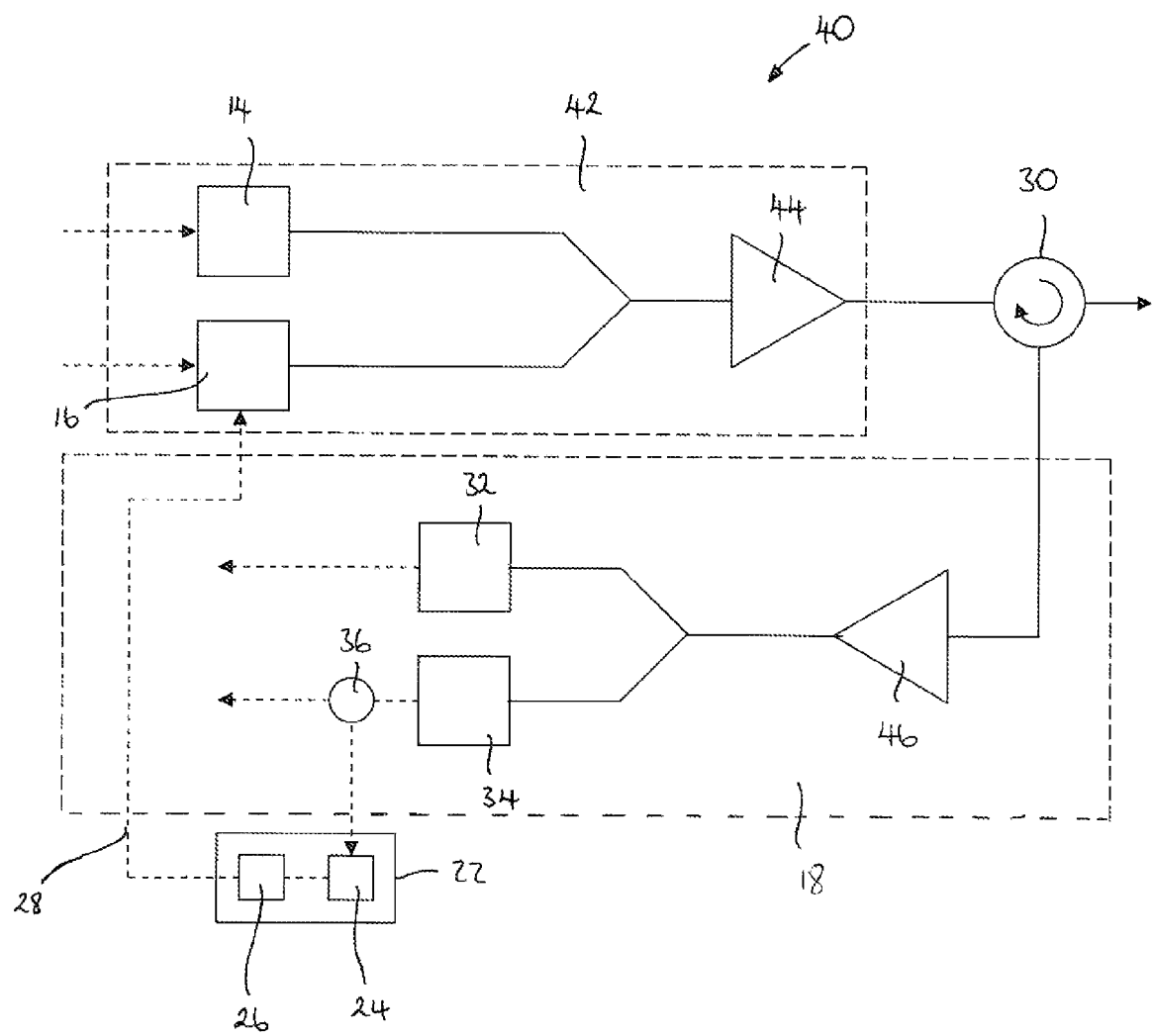
FIG. 2 is a schematic representation of a free space optical communications link node according to a second embodiment of the invention.

A second embodiment of the invention provides a free space optical communications link node 40, as shown in FIG. 2. The node 40 of this embodiment is similar to the node 10 or FIG. 1, with the following modifications. The same reference numbers are retained for corresponding features.

In this embodiment, the transmitter apparatus 42 further comprises a second optical amplifier 44. The second optical amplifier is arranged to receive and amplify each upstream optical signal. The second optical amplifier 44 is arranged to operate in saturation. The control signal 28 is arranged to cause the second optical signal power to have a value such that the second upstream optical signal does not reduce the gain of the second optical amplifier 44 available to amplify the first upstream optical signal.

When both first and second upstream optical signals are present, the second optical amplifier 44 shares the total available output optical power between the two upstream optical signals. When the second upstream optical signal has its optical signal power reduced to a value at which is does not reduce the gain of the second optical amplifier 44 available to amplify the first upstream optical signal, the full output power available from the second optical amplifier 44 is provided to the first upstream optical signal.

In this embodiment, the first optical amplifier 46 is arranged to operate linearly at an input optical signal power below a second threshold value. The first optical amplifier 46 has a gain profile comprising a gain peak. The first downstream optical signal has a third wavelength which comprises a wavelength within the gain peak of the first optical amplifier 46. The first optical amplifier 46 is arranged to operate in saturation at an input optical signal power above the second threshold value.

When the first and second downstream optical signals have a combined input optical signal power at the first optical amplifier 46 which is above the second threshold value, the first optical amplifier operates in saturation. The available gain and the total available output power of the first optical amplifier 46 is therefore shared between the first and second downstream optical signals.

When the combined optical signal power of the first and second downstream optical signals is below the second threshold value, the first optical amplifier 46 operates linearly and has a gain profile comprising a gain peak. This may occur for example when no second downstream optical signal is received, due to loss experienced by the second downstream optical signal on transmission, or when the second downstream optical signal has an optical signal power that is so low as to be unusable. When the first optical amplifier 46 operates linearly, the first downstream optical signal experiences an increased gain, due to the gain peak.

Figure 3:
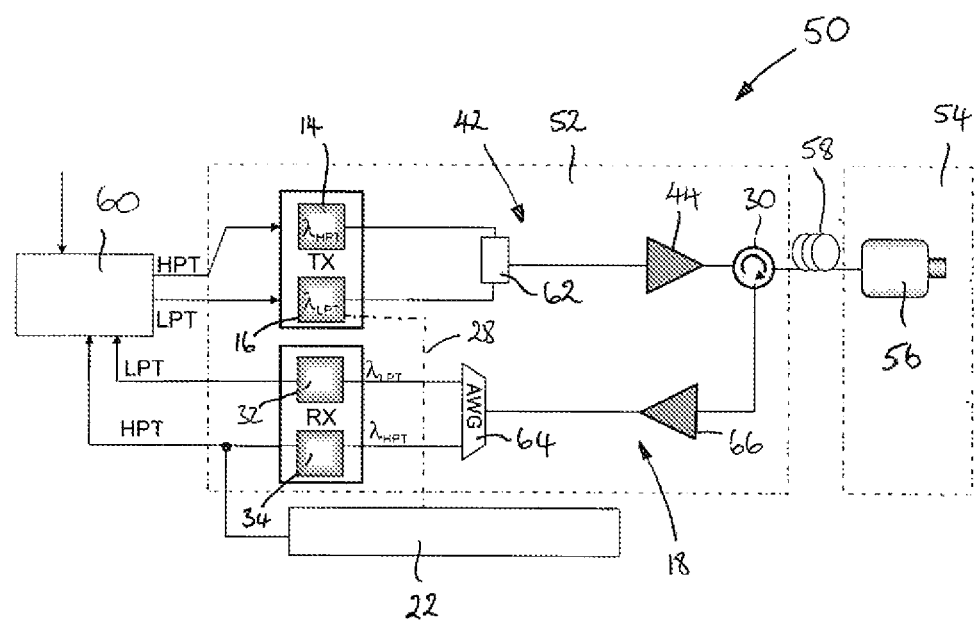
FIG. 3 is a schematic representation of a free space optical communications link node according to a third embodiment of the invention.

A third embodiment of the invention provides a free space optical communications link node 50, as shown in FIG. 3. The free space optical communications link node 50 of this embodiment is similar to the node 40 of FIG. 2, with the following modifications. The same reference numbers are retained for corresponding features.

In this embodiment, the transmitter apparatus 42 and the receiver apparatus 18 are provided in an indoor unit 52 and the node 50 further comprises an outdoor unit 54. The outdoor unit 54 comprises output optics 56 which are coupled to the optical circulator 30 via an optical fibre 58.

The free space optical communications link node 50 further comprises a switch 60 arranged to receive high priority traffic (HPT) and low priority traffic (LPT) and to route the traffic to the appropriate optical transmitter 14, 16. The switch 60 also receives LPT and HPT from the optical receivers 32, 34 in the receiver apparatus 18.

In this embodiment, the first upstream optical signal and the second upstream optical signal are combined in an optical signal combiner 62 prior to delivery to the second optical amplifier 44. The optical receiver apparatus 18 further comprises an optical router, in the form of an arrayed waveguide grating (AWG) 64, arranged to receive the first and second downstream optical signals from the first optical amplifier 66 and to route the optical signals to the appropriate optical receiver 32, 34.

In this embodiment, the first optical amplifier 66 comprises an erbium doped fibre amplifier (EDFA) and has a gain tilt arranged to cause its gain profile to comprise a gain peak when the input optical signal power is below the second threshold value. The gain profile of the first optical amplifier 66 therefore automatically changes as the input optical signal power changes, so that increased gain is made available to the first downstream optical signal when the input optical signal power falls below the second threshold value.

Figure 4:
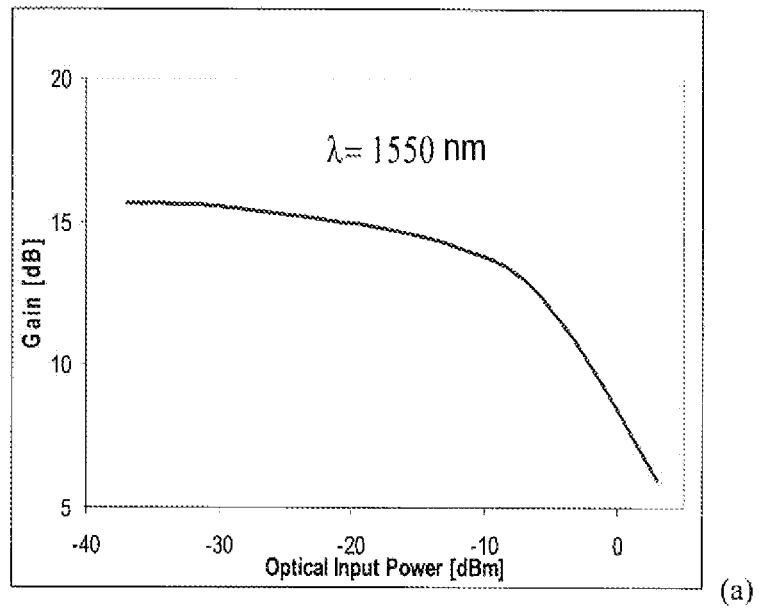
FIG. 4 shows (a) gain and (b) gain variation (tilt) as a function of input optical power for the EDFAs of FIG. 3.
Figure 4:
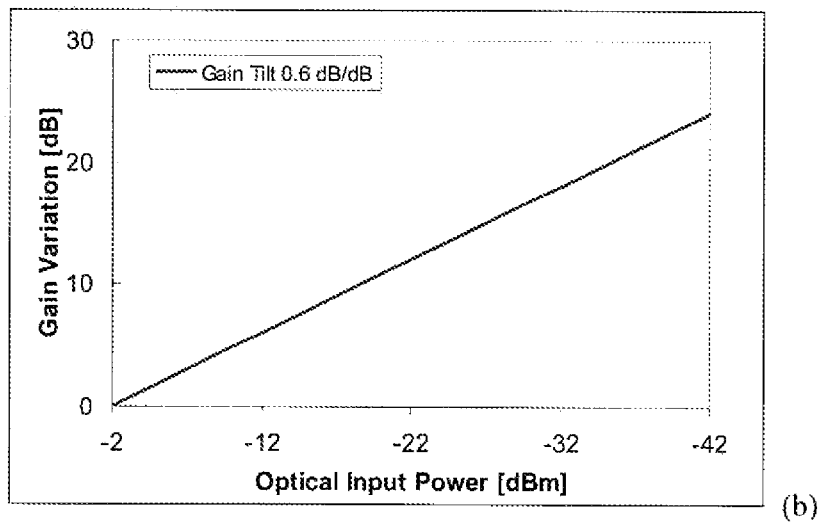

FIG. 4(*a*) shows the gain profile (gain as a function of optical input power) of the first optical amplifier 66 at a wavelength of 1550 nm. FIG. 4(*b*) shows the gain variation as a function of optical input power of the first optical amplifier 66. The first optical amplifier 66 has a gain tilt of 0.6 dB/dB.

In this embodiment, the control signal 28 is arranged to cause the second optical signal power to have a value less than the optical signal power loss which the second upstream optical signal will experience during transmission. This will ensure that the second upstream optical signal is not received at a remote free space optical communications link node.

Figure 5:
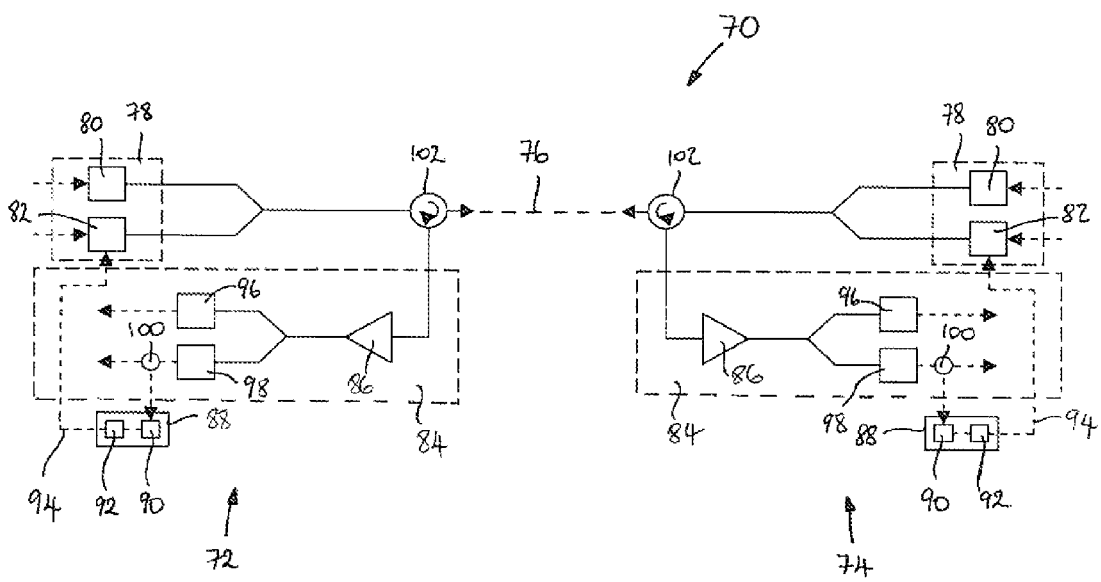
FIG. 5 is a schematic representation of a free space optical communications network according to a fourth embodiment of the invention.

A fourth embodiment of the invention provides a free space optical communications network 70 as shown in FIG. 5. The network 70 comprises a first free space optical communications link node 72 and a second free space optical communications link node 74. The second node 74 is located remote from the first node 72 and is arranged for communication with the first node 72 across a free space optical (FSO) link 76.

Each free space optical communications link node 72, 74 comprises transmitter apparatus 78, receiver apparatus 84 and traffic handling control apparatus 88. Each transmitter apparatus 78 comprises a first optical transmitter 80 arranged to transmit high priority traffic on a first optical signal having a first wavelength and at a first optical signal power. Each second optical transmitter 82 is arranged to transmit low priority traffic on the second optical signal having a second wavelength and at a second optical signal power. The second wavelength is different to the first wavelength.

Each receiver apparatus comprises a first optical amplifier 86 arranged to receive, from the other free space optical communications link node, a first optical signal and a second optical signal. The first optical amplifier 86 is arranged to amplify each received optical signal.

The traffic handling control apparatus 88 comprises a power monitor 90 and a controller 92. The power monitor 90 is arranged to monitor an optical signal power of the first optical signal received from the other free space optical communications link node. The controller is arranged to generate and transmit a control signal 94 if the optical signal power is below a first threshold value. The control signal 94 is arranged to cause the second optical signal power to have a value which is unsuitable for transmission.

Each controller 92 of is arranged to generate and transmit a control signal 94 if the optical signal power of a first optical signal received from the other node is below a first threshold value. The control signal 94 is delivered to the second optical transmitter 82 of the respective node 72, 74 and is arranged to cause the second optical signal power to have a value which is unsuitable for transmission. By unsuitable for transmission we mean that the optical signal power is such that a second optical signal is not received at the other free space optical communications link node or that the second upstream optical signal when received at the other node is unusable, for example due to its signal power level being too low, or its optical signal to noise ratio or bit error rate being unacceptable.

Figure 6:
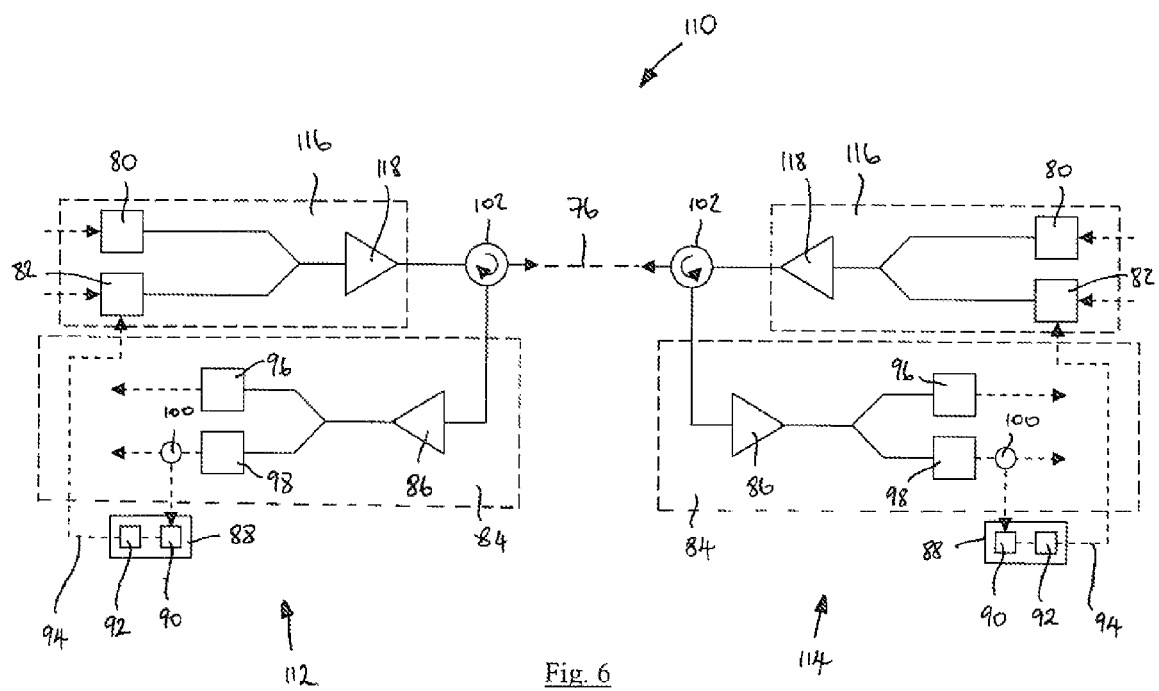
FIG. 6 is a schematic representation of a free space optical communications network according to a fifth embodiment of the invention.

A fifth embodiment of the invention provides a free space optical communications network 110, as shown in FIG. 6. The network 110 of this embodiment is similar to the network 70 of FIG. 5, with the following modifications. The same reference numbers are retained for corresponding features.

In this embodiment, each transmitter apparatus 116 further comprises a second optical amplifier 118. Each second optical amplifier is arranged to receive and amplify each optical signal to be transmitted from the respective transmitter apparatus 116. The second optical amplifier 118 is arranged to operate in saturation. Each control signal 94 is arranged to cause the respective second optical signal power to have a value such that the second optical signal does not reduce the gain of the second optical amplifier 118 available to amplify the first optical signal.

When both first and second optical signals are present, the second optical amplifier 118 shares the total available output optical power between the two optical signals. When the second optical signal has its optical signal power reduced to a value at which is does not reduce the gain of the second optical amplifier 118 available to amplify the first optical signal, the full output power available from the second optical amplifier 118 is provided to the first optical signal.

In this embodiment, each first optical amplifier 86 is arranged to operate linearly at an input optical signal power below a second threshold value. Each first optical amplifier 86 has a gain profile comprising a gain peak. Each first optical signal has a wavelength which comprises a wavelength within the gain peak of the respective first optical amplifier 86 at which it is to be received. Each first optical amplifier 86 is arranged to operate in saturation at an input optical signal power above the second threshold value.

When the first and second optical signals received at a respective first optical amplifier 86 have a combined input optical signal power which is above the second threshold value, the first optical amplifier operates in saturation. The available gain and the total available output power of the first optical amplifier 86 is therefore shared between the first and second optical signals.

When the combined received optical signal power of the first and second optical signals is below the second threshold value, the first optical amplifier 86 operates linearly and has a gain profile comprising a gain peak. This may occur for example when no second optical signal is received, due to loss experienced by the second optical signal on transmission across the FSO link 76, or when the second optical signal has an optical signal power that is so low as to be unusable. When a first optical amplifier 86 operates linearly, a received first optical signal experiences an increased gain, due to the gain peak.

Figure 7:
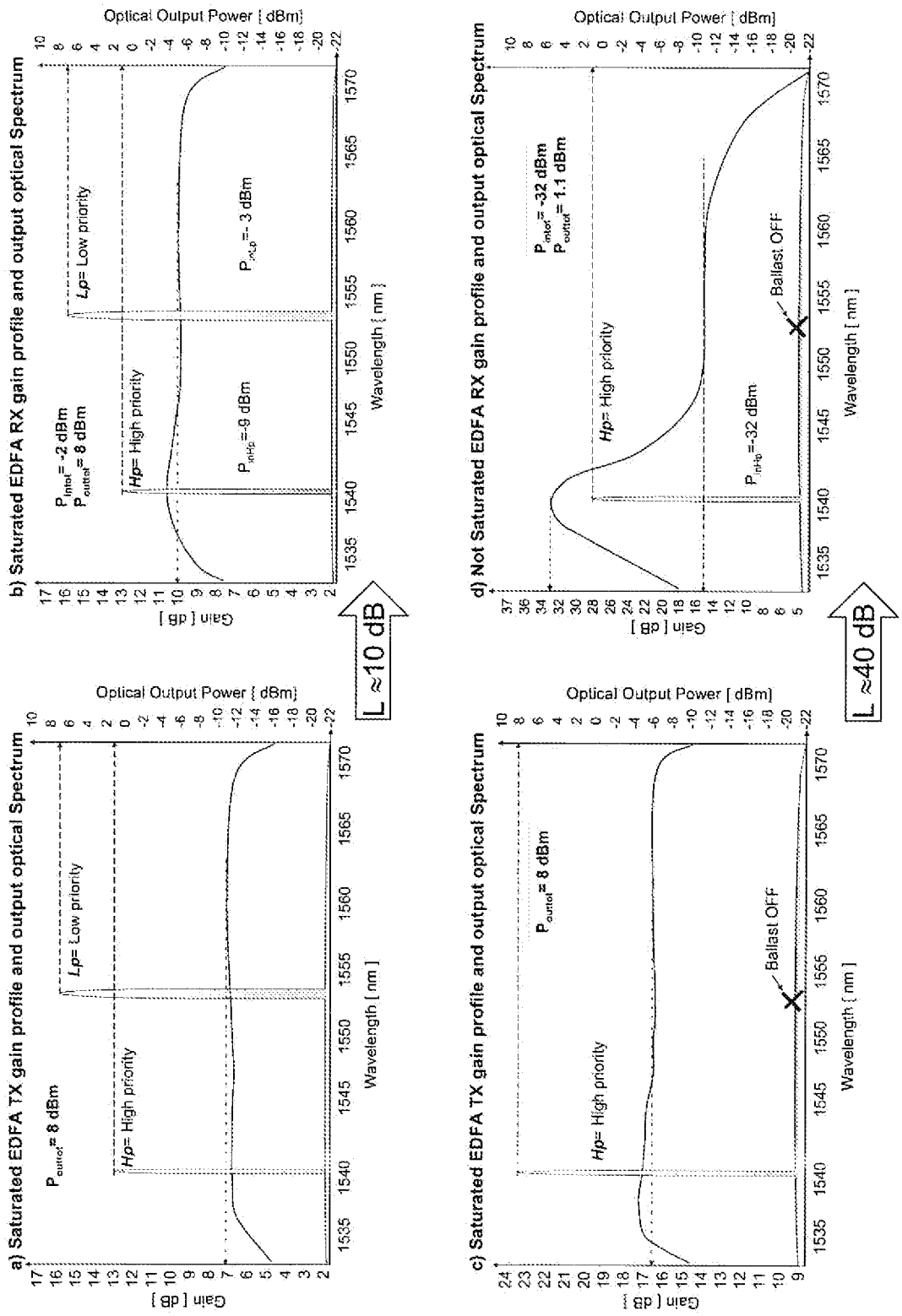
FIG. 7(a) shows the saturated gain profile of the transmitter EDFA of FIG. 6 and the optical spectra of the first upstream optical signal (Hp=high priority) and the second upstream optical signal (Lp=low priority) output from the transmitter EDFA.
FIG. 7(b) shows the saturated gain profile of the receiver EDFA of FIG. 6 and the optical spectra of the first upstream optical signal (Hp=high priority) and the second upstream optical signal (Lp=low priority) output from the receiver EDFA, following transmission of the optical signals of FIG. 7(a) across an optical link having an optical signal power loss of ~10 dB.
FIG. 7(c) shows the saturated gain profile of the transmitter EDFA of FIG. 6 and the optical spectrum of the first upstream optical signal (Hp=high priority) output from the transmitter EDFA, in the case where the second optical signal is in an idle mode.
FIG. 7(d) shows the linear gain profile of the receiver EDFA of FIG. 6 and the optical spectrum of the first upstream optical signal (Hp=high priority) output from the receiver EDFA, following transmission of the first upstream optical signal of FIG. 7(c) across an optical link having an optical signal power loss of ~40 dB.

FIG. 7(*a*) shows the saturated gain profile of the second optical amplifier 118 of the first free space optical communications link node 112 of the network 110 of FIG. 6. FIG. 7(*a*) also shows the optical spectra of a first upstream (transmission in the direction from the first node 112 to the second node 114) optical signal (Hp=high priority) and a second upstream optical signal (Lp=low priority) output from the second optical amplifier 118. In this example, each second optical amplifier 118 comprises an erbium doped fibre amplifier (EDFA).

FIG. 7(*b*) shows the saturated gain profile of the first optical amplifier 86 of the receiver apparatus 84 of the first free space optical communications link node 114 of the network 110 of FIG. 6. In this example the first optical amplifier 86 also comprises an EDFA. FIG. 7(*b*) also shows the optical spectrum of the first upstream optical signal (Hp=high priority) and the optical spectrum of the second upstream optical signal (Lp=low priority) output from the first EDFA 86 of the second free space optical communications link node 114.

Following amplification by the second EDFA 118 in the first node 112, the first upstream optical signal has an optical output power of approximately 1 dBm and the second upstream optical signal has an optical output power of approximately 7 dBm, giving a total saturated output power from the second EDFA 118 of 8 dBm. On transmission across the FSO link 76 the first and second upstream optical signals suffer approximately 10 dB loss, giving a combined input optical power at the first EDFA 86 of the second node 114 of approximately −2 dBm. The first upstream optical signal has an input optical power at the first EDFA 86 of −9 dBm and the second upstream optical signal has an input optical power at the first EDFA 86 of −3 dBm. Following amplification at the first EDFA 86 the first upstream optical signal (Hp=high priority) has an optical output power of 1 dBm and the second upstream optical signal (Lp=low priority) of 7 dBm. Each of the upstream optical signals is therefore output from the first EDFA 86 with the same optical power level as it was launched onto the FSO link 76 at.

FIG. 7 (*c*) shows the saturated gain profile of the second EDFA 118 of the first node 112 when the second upstream optical signal is in an idle mode and therefore does not use any of the gain available to the first upstream optical signal. The full gain of the second EDFA 118 is therefore available to the first upstream optical signal, which is amplified to an output power of 8 dBm.

FIG. 7(*d*) shows the linear gain profile of the first EDFA 86 of the second node 114 when only a first upstream optical signal is received. The first upstream optical signal experiences approximately 40 db loss on transmission across the FSO link 76 and arrives at the first EDFA 86 at the second node 114 with an input power of −32 dBm. This is below the second threshold optical power of the first EDFA 86 which therefore operates linearly, having a gain tilt as shown in FIG. 4 and a gain peak in the wavelength range 1535-1540 nm. FIG. 7(*d*) also shows the output optical spectrum of the first upstream optical signal output from the first EDFA 86. The first upstream optical signal has a wavelength of approximately 1540 nm in this example and therefore lies within the gain peak of the first EDFA 86. As can be seen, due to the gain peak, the first upstream optical signal experiences a significantly larger amount of gain than when both the first and second upstream optical signals are received at the first EDFA 86 of the second node 114. In this example, the upstream optical signal is amplified to an output optical power of 1.1 dBm.

Figure 8:
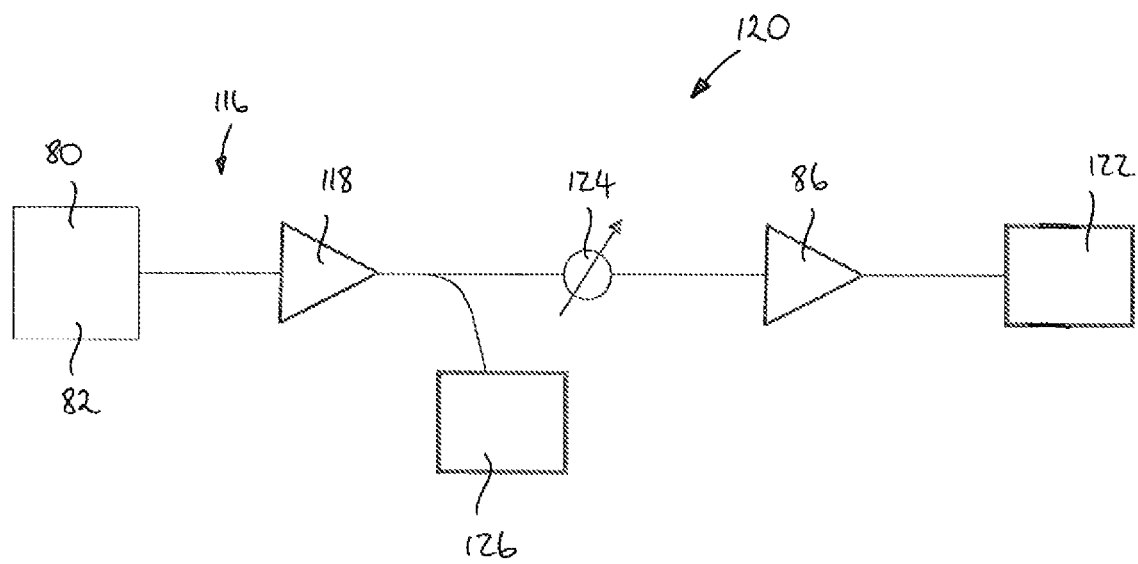
FIG. 8 is a schematic representation of an experimental set up representing the upstream path of a free space optical communications network according to a sixth embodiment of the invention.

FIG. 8 shows a schematic representation of an experimental set up representing the upstream path 120 of a free space optical communications network according to a sixth embodiment of the invention.

The free space optical communications network of this embodiment is similar to the network of FIG. 6, with the following modifications. The same reference numbers are retained for corresponding features. The experimental set up of the upstream optical path 120 additionally comprises a first optical spectrum analyser (OSA) 122, a variable optical attenuator 124 and a second OSA 126. Each OSA 122, 126 has a resolution bandwidth of 0.1 nm and is arranged to measure the output optical signals from the first EDFA 86 and the second EDFA 118 respectively. The variable optical attenuator 124 is arranged to simulate optical losses of the FSO link 76.

Figure 9:
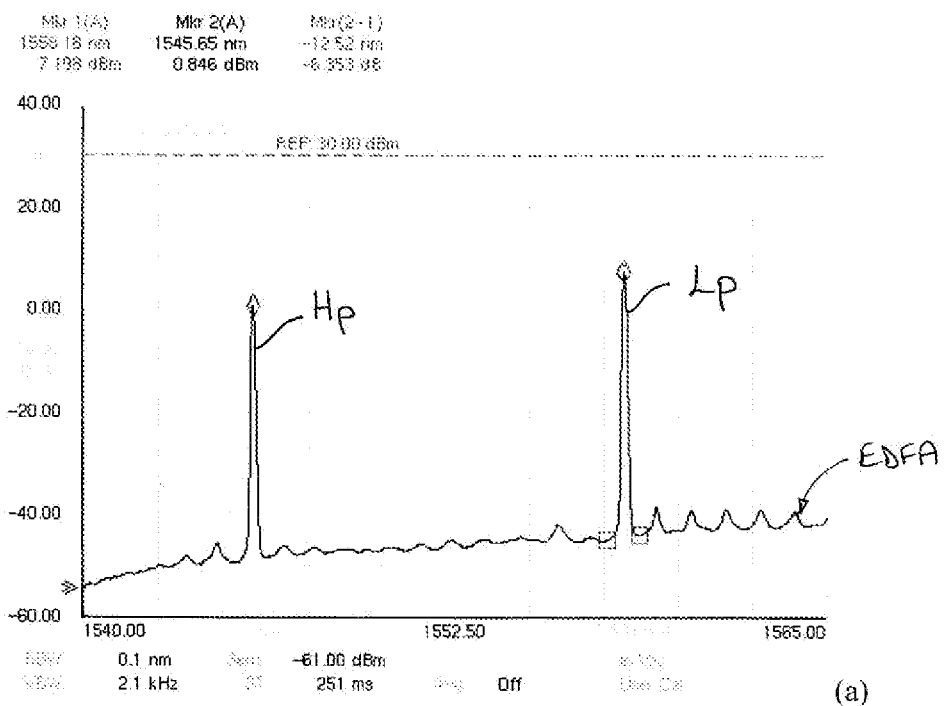
FIG. 9(a) shows the saturated gain profile of the transmitter EDFA of FIG. 8 and the optical spectra of the first upstream optical signal and the second upstream optical signal output from the transmitter EDFA.
FIG. 9(b) shows the saturated gain profile of the receiver EDFA of FIG. 8 and the optical spectra of the first upstream optical signal and the second upstream optical signal output from the receiver EDFA, following transmission of the optical signals of FIG. 9(a) across an optical link having an optical signal power loss of ~10 dB.
Figure 9:
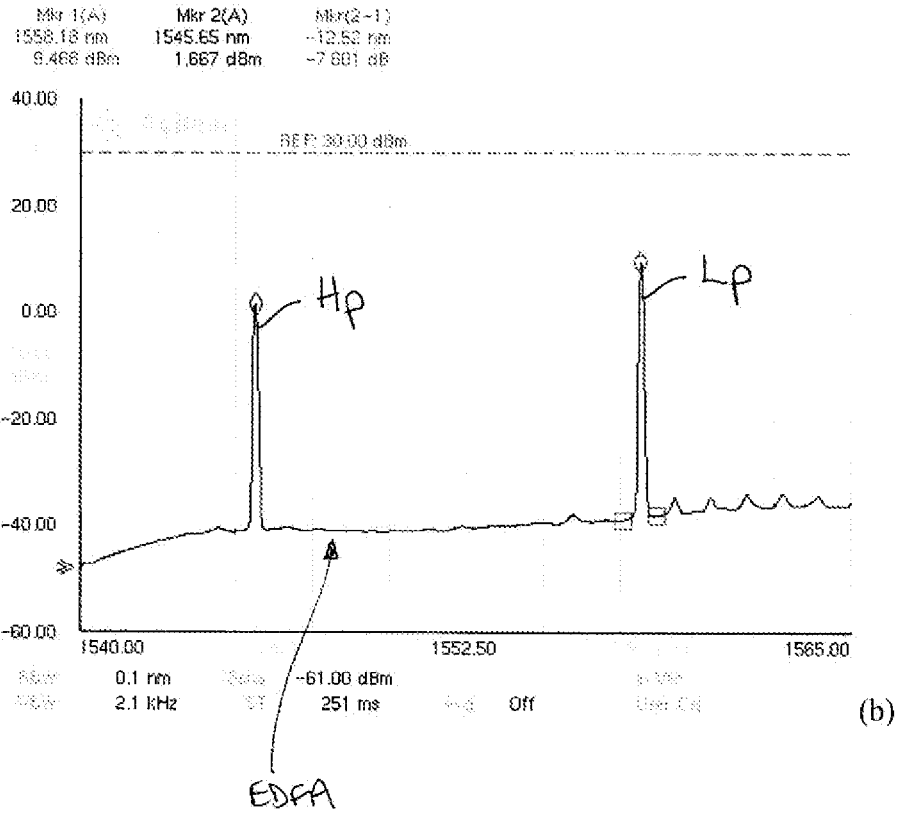

FIG. 9(*a*) shows the optical output of the second EDFA 118 measured by the OSA 126, on which the optical spectra of the first upstream optical signal (Hp) and the second upstream optical signal (Lp) are shown on top of the optical spectrum of the EDFA 118. FIG. 9(*b*) shows the output optical signal of the first EDFA 86 measured by the OSA 122. The optical spectrum shows the first upstream optical signal (Hp) and the second upstream optical signal (Lp) on the optical spectrum of the EDFA 86. In this example the variable optical attenuator 124 simulated an optical link loss of 10 dB. As can be seen comparing the optical spectra of FIG. 9(*b*) with those of FIG. 9(*a*), both the first and second upstream optical signals have substantially the same output optical power following amplification at each of the EDFAs 118, 86.

Figure 10:
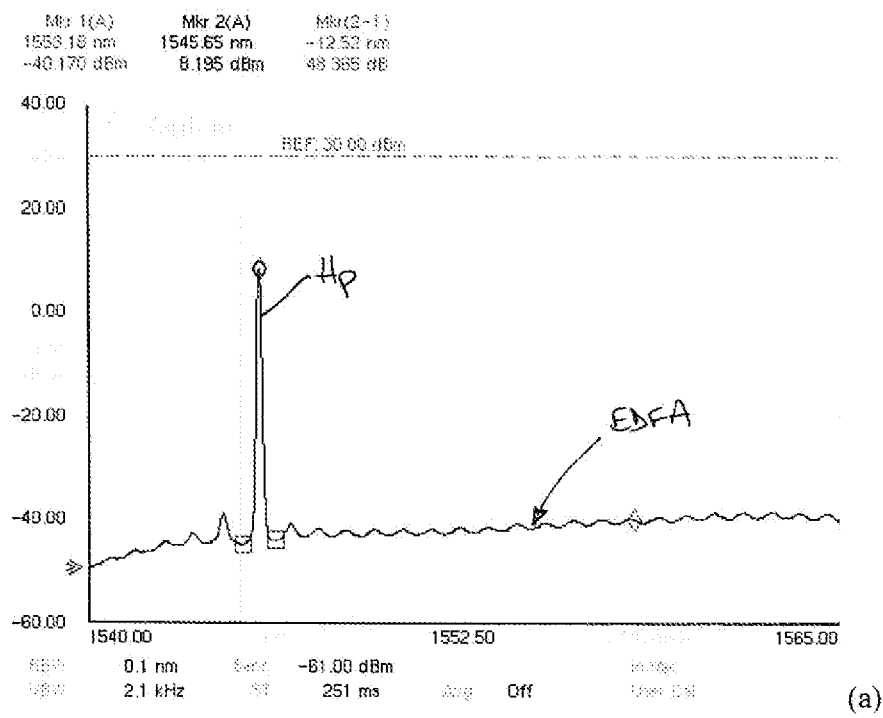
FIG. 10(a) shows the saturated gain profile of the transmitter EDFA of FIG. 8 and the optical spectrum of the first upstream optical signal output from the transmitter EDFA, in the case where the second optical transmitter is switched off.
FIG. 10(b) shows the linear gain profile of the receiver EDFA of FIG. 8 and the optical spectrum of the first upstream optical signal output from the receiver EDFA, following transmission of the first upstream optical signal of FIG. 10(a) across an optical link having an optical signal power loss of ~40 dB.
Figure 10:
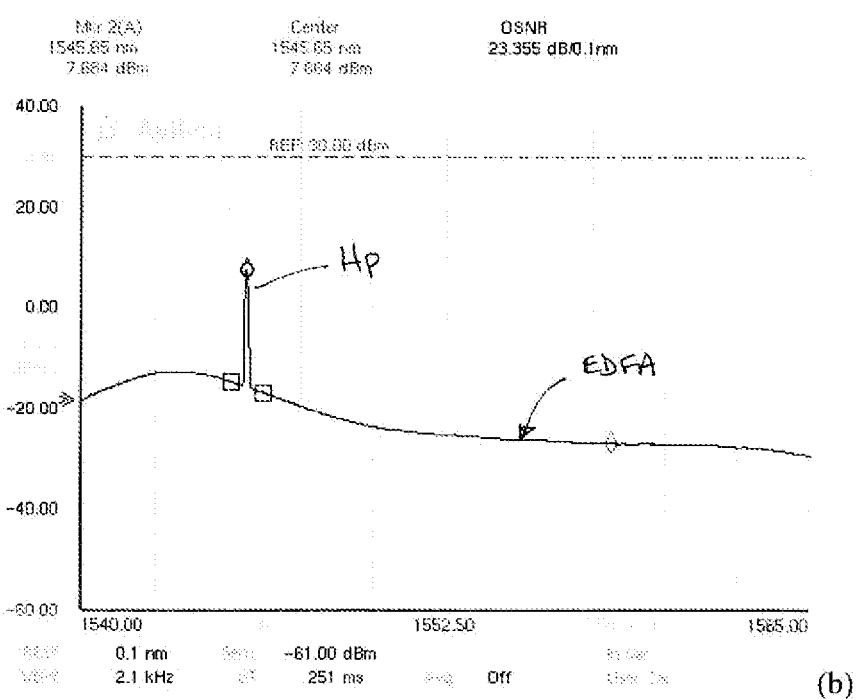

Referring to FIG. 10, the output optical spectra from the second EDFA 118 and the first EDFA 86 are shown for a second experimental test in which the second upstream optical signal was turned off and the variable optical attenuator 124 was arranged to simulate losses across the FSO link 76 of 40 dB. As shown in FIG. 10(*a*), the first upstream optical signal (Hp) has an output optical signal power of approximately 8 dBm following amplification by the second EDFA 118. Following transmission across the FSO link, the upstream optical signal was received at the first EDFA 86 with an input optical power of approximately −32 dBm. Following amplification by the now linearly operating first EDFA 86, the first upstream optical signal (Hp) has an output optical power of approximately 8 dBm.

Comparing FIG. 10(b) with FIG. 9(b), it can clearly be seen that the first upstream optical signal (Hp) experiences significantly more gain when the second upstream optical signal is not present, due to the gain tilt effect in the first EDFA 86 at the lower input optical signal power.

Figure 11:
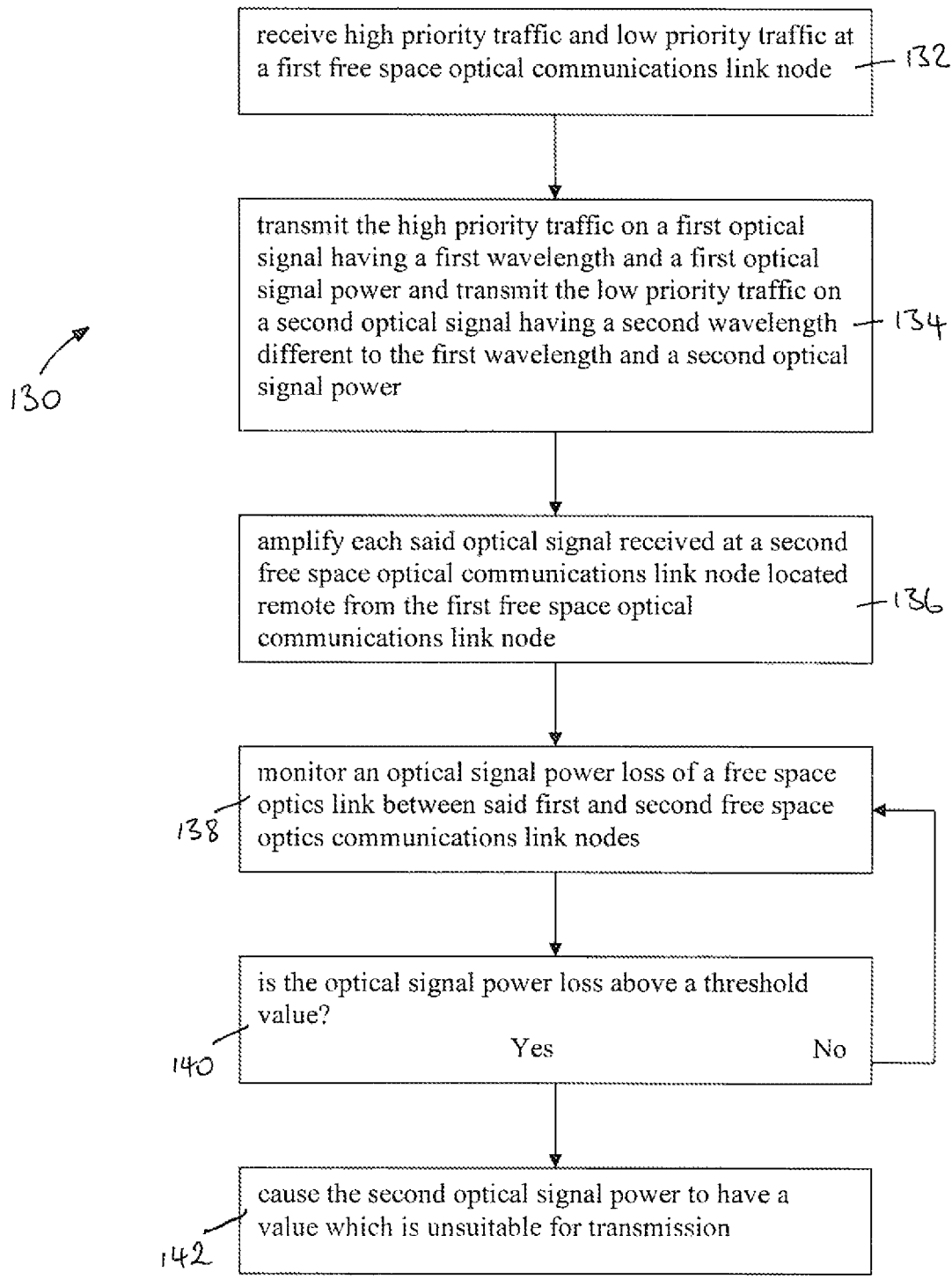
FIG. 11 shows the steps of a method of transmitting traffic across a free space optical communications link according to a seventh embodiment of the invention.

FIG. 11 shows the steps of a method 130 according to a seventh embodiment of the invention.

The method 130 comprises receiving high priority traffic and low priority traffic at a first free space optical communications link node (132). The high priority traffic is transmitted on a first optical signal having a first wavelength and a first optical signal power (134). The low priority traffic is transmitted on a second optical signal having a second wavelength different to the first wavelength and a second optical signal power (134). It will be appreciated that the first and second optical signals may be transmitted together or in any order.

The method further comprises amplifying each optical signal received at a second free space optical communications link node located remote from the first free space optical communications link node (136). An optical signal power loss of a free space optical link between said first and second free space optical communications link nodes is monitored (138) and if the optical signal power loss is above a threshold value (140), the method comprises causing the second optical signal power to have a value which is unsuitable for transmission (142).

Figure 12:
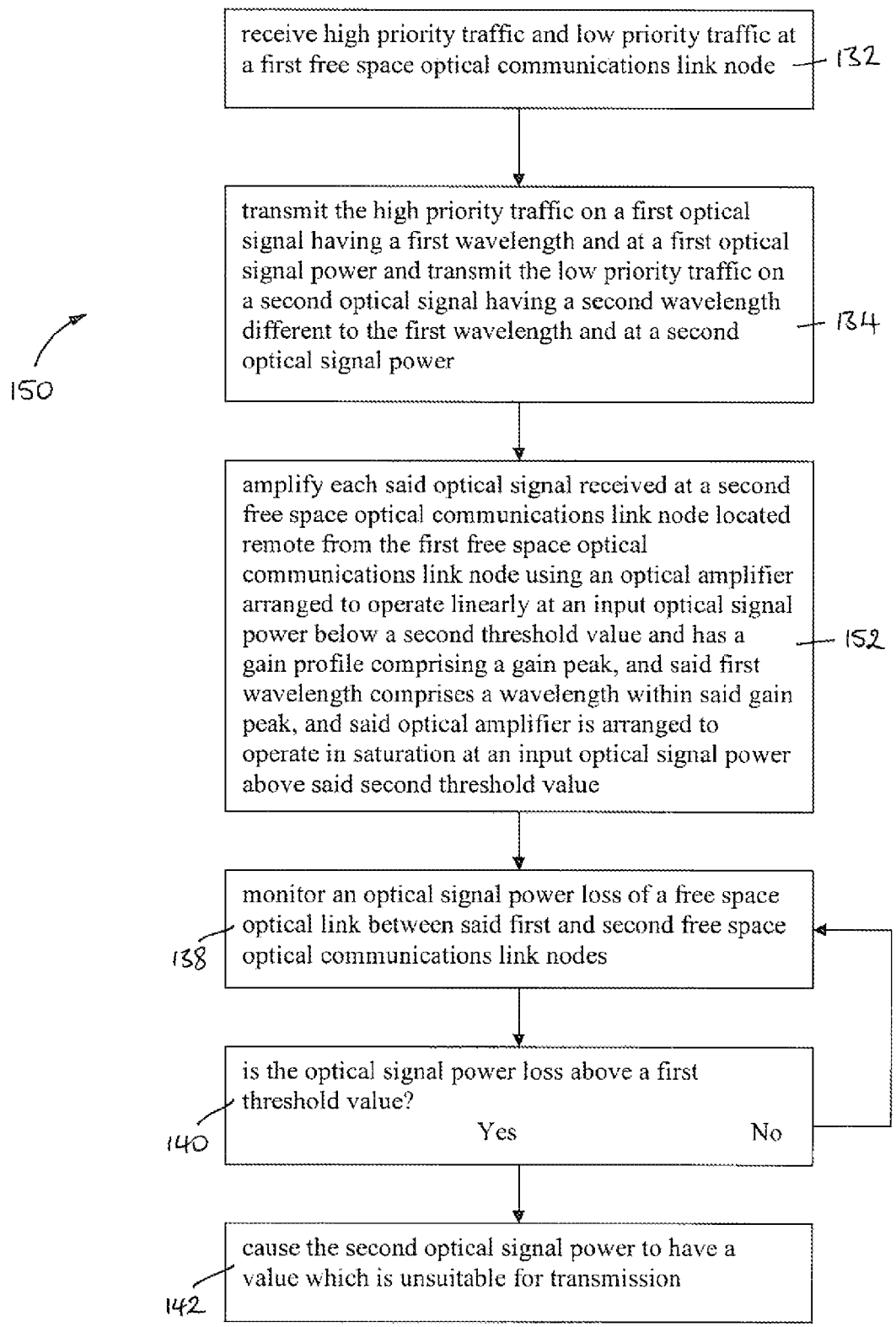
FIG. 12 shows the steps of a method of transmitting traffic across a free space optical communications link according to an eighth embodiment of the invention.

FIG. 12 shows the steps of a method 150 according to an eighth embodiment of the invention. The method 150 of this embodiment is similar to the method 130 of the previous embodiment, with the following modifications. The same reference numbers are retained for corresponding steps.

In this embodiment, each optical signal received at the second free space optical communications link node is amplified by an optical amplifier arranged to operate linearly at an input optical signal power below a second threshold value and having a gain profile comprising a gain peak 152. The first wavelength comprises a wavelength within the gain peak, and the optical amplifier is arranged to operate in saturation at an input optical signal power above the second threshold value 152.

Figure 13:
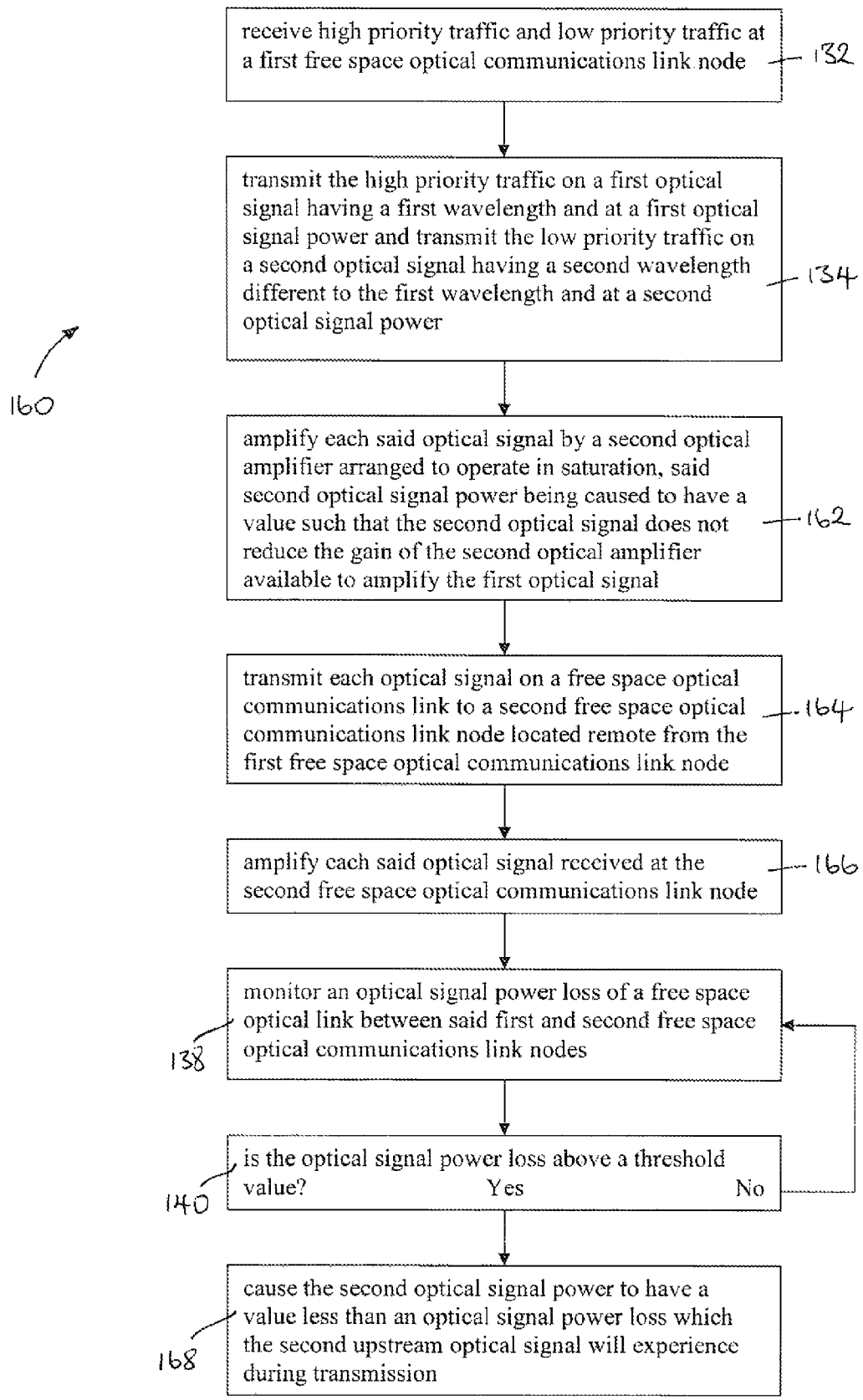
FIG. 13 shows the steps of a method of transmitting traffic across a free space optical communications link according to a ninth embodiment of the invention.

FIG. 13 shows the steps of a method 160 according to a ninth embodiment of the invention. The method 160 of this embodiment is similar to the method 130 of the first embodiment, with the following modifications. The same reference numbers are retained for corresponding steps.

The method 160 of this embodiment further comprises amplifying each optical signal before transmission on the free space optical link 162. The optical signals are amplified by a second optical amplifier which is arranged to operate in saturation. The method comprises causing the second optical signal power to have a value such that the second optical signal does not reduce the gain of the second optical amplifier available to amplify the first optical signal 162.

Following amplification, each optical signal is transmitted on an FSO link to a second free space optical communications link node located remote from the first free space optical communications link node 164. Each optical signal received at the second free space optical communications link node is amplified 166.

The method 160 further comprises causing the second optical signal power to have a value less than an optical signal power loss which the second upstream optical signal will experience during transmission 168.

A ninth embodiment of the invention provides a data carrier having computer readable instructions embodied therein. The said computer readable instructions are for providing access to resources available on a processor. The computer readable instructions comprise instructions to cause the processor to perform the steps of either of the methods 130, 150, 160 described above of transmitting traffic across a free space optical communications link.

The invention claimed is:

1. A free space optical communications link node comprising:
   transmitter apparatus comprising:
      a first optical transmitter arranged to transmit high priority traffic on a first upstream optical signal having a first wavelength and at a first optical signal power; and
      a second optical transmitter arranged to transmit low priority traffic on a second upstream optical signal having a second wavelength different to the first wavelength and at a second optical signal power; and
   receiver apparatus comprising:
      a first optical amplifier arranged to receive and amplify a first downstream optical signal having a third wavelength and carrying high priority traffic and a second downstream optical signal having a fourth wavelength different to the third wavelength and carrying low priority traffic;
   and
   traffic handling control apparatus comprising a power monitor arranged to monitor an optical signal power of the first downstream optical signal and a controller arranged to generate and transmit a control signal if said optical signal power is below a first threshold value, the control signal being arranged to cause the second optical signal power to have a value which is unsuitable for transmission.

2. A free space optical communications link node as claimed in claim 1, wherein the first optical amplifier is arranged to operate linearly at an input optical signal power below a second threshold value and has a gain profile comprising a gain peak, and the third wavelength comprises a wavelength within said gain peak, and the first optical amplifier is arranged to operate in saturation at an input optical signal power above the second threshold value.

3. A free space optical communications link node as claimed in claim 2, wherein the first optical amplifier has a gain tilt arranged to cause its gain profile to comprise said gain peak when the input optical signal power is below the second threshold value.

4. A free space optical communications link node as claimed in claim 1, wherein the transmitter apparatus further comprises a second optical amplifier arranged to receive and amplify each upstream optical signal, the second optical amplifier being arranged to operate in saturation and the control signal being arranged to cause the second optical signal power to have a value such that the second upstream optical signal does not reduce the gain of the second optical amplifier available to amplify the first upstream optical signal.

5. A free space optical communications link node as claimed in claim 1, wherein the control signal is arranged to cause the second optical signal power to have a value less than an optical signal power loss which the second upstream optical signal will experience during transmission.

6. A free space optical communications network comprising:
   a first free space optical communications link node; and
   a second free space optical communications link node located remote from and arranged for communication with the first free space optical communications link node across a free space optics link, each free space optical communications link node comprising:
  transmitter apparatus comprising:
    a first optical transmitter arranged to transmit high priority traffic on a first optical signal having a first wavelength and at a first optical signal power; and
    a second optical transmitter arranged to transmit low priority traffic on a second optical signal having a second wavelength different to the first wavelength and at a second optical signal power; and
  receiver apparatus comprising:
    a first optical amplifier arranged to receive from the other free space optical communications link node a said first optical signal and a said second optical signal and further arranged to amplify each said optical signal;
  and
  traffic handling control apparatus comprising a power monitor arranged to monitor an optical signal power of said first optical signal received from the other free space optics communications link node and a controller arranged to generate and transmit a control signal if said optical signal power is below a first threshold value, the control signal being arranged to cause said second optical signal power to have a value which is unsuitable for transmission.

7. A free space optical communications network as claimed in claim 6, wherein each said optical amplifier is arranged to operate linearly at an input optical signal power below a second threshold value and has a gain profile comprising a gain peak, and said first wavelength comprises a wavelength within said gain peak, and each said optical amplifier is arranged to operate in saturation at an input optical signal power above said second threshold value.

8. A free space optics communications network as claimed in claim 7, wherein each said optical amplifier has a gain tilt arranged to cause its gain profile to comprise said gain peak when the input optical signal power is below the second threshold value.

9. A free space optics communications network as claimed in claim 6, wherein each transmitter apparatus further comprises a second optical amplifier arranged to receive and amplify said respective first and second optical signals, the second optical amplifier being arranged to operate in saturation and the control signal being arranged to cause said second optical signal power to have a value such that said second optical signal does not reduce the gain of the second optical amplifier available to amplify said first optical signal.

10. A free space optics communications network as claimed in claim 6, wherein each control signal is arranged to cause said respective second optical signal power to have a value less than an optical signal power loss of the free space optics link.

11. A method of transmitting traffic across a free space optical communications link, the method comprising:
  receiving high priority traffic and low priority traffic at a first free space optical communications link node;
  transmitting the high priority traffic on a first optical signal having a first wavelength and at a first optical signal power;
  transmitting the low priority traffic on a second optical signal having a second wavelength different to the first wavelength and at a second optical signal power;
  amplifying each said optical signal received at a second free space optical communications link node located remote from the first free space optical communications link node;
  monitoring an optical signal power loss of a free space optical link between said first and second free space optical communications link nodes and if the optical signal power loss is above a threshold value, causing the second optical signal power to have a value which is unsuitable for transmission.

12. A method as claimed in claim 11, wherein each said optical signal received at said second free space optical communications link node is amplified by an optical amplifier arranged to operate linearly at an input optical signal power below a second threshold value and having a gain profile comprising a gain peak, and said first wavelength comprises a wavelength within said gain peak, and said optical amplifier is arranged to operate in saturation at an input optical signal power above said second threshold value.

13. A method as claimed in claim 12, wherein said optical amplifier has a gain tilt arranged to cause its gain profile to comprise said gain peak when the input optical signal power is below the second threshold value.

14. A method as claimed in claim 11, wherein the method further comprises amplifying each said optical signal before transmission on the free space optical link, the optical signals being amplified by a second optical amplifier arranged to operate in saturation and the method comprises causing said second optical signal power to have a value such that the second optical signal does not reduce the gain of the second optical amplifier available to amplify the first optical signal.

15. A method as claimed in claim 11, wherein the method comprises causing the second optical signal power to have a value less than an optical signal power loss which the second upstream optical signal will experience during transmission.

* * * * *